Aug. 26, 1924.  
L. WHITCOMB  
1,506,470  
TORSION ROD FOR AUTOMOBILES  
Filed Aug. 28, 1923
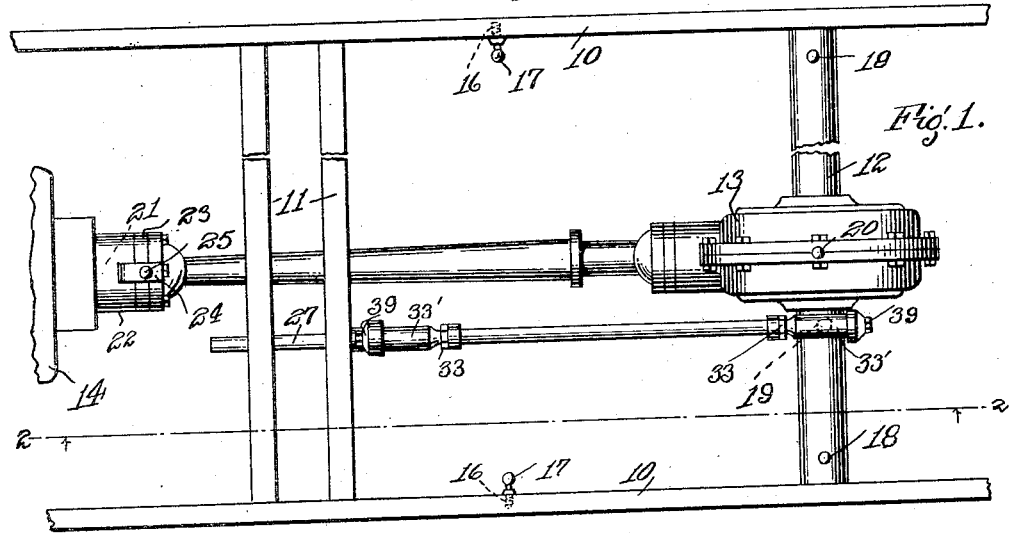
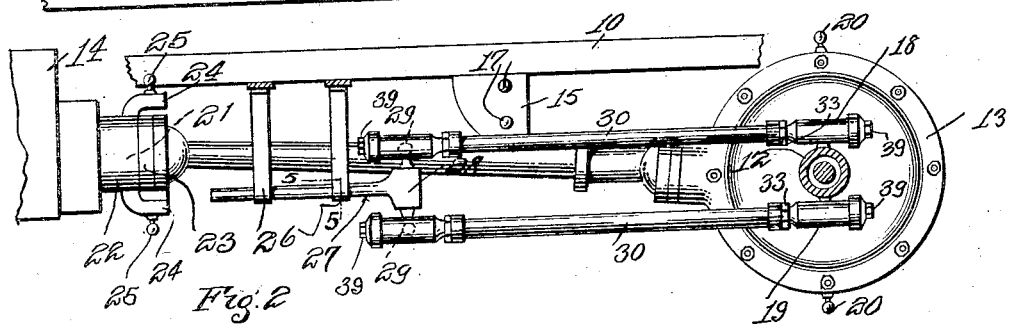
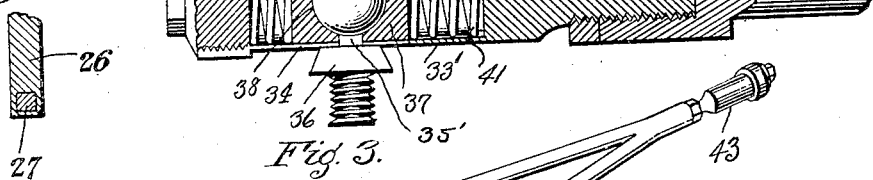
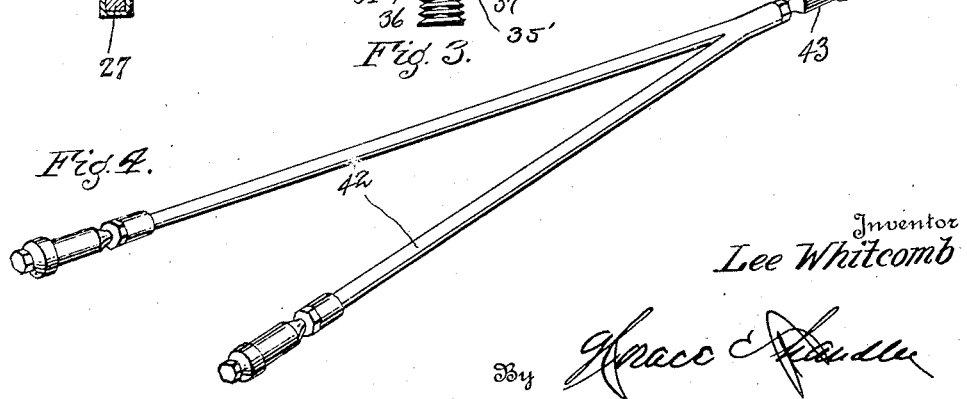
Inventor  
Lee Whitcomb  
By  
Attorney Patented Aug. 26, 1924.

1,506,470

UNITED STATES PATENT OFFICE.

LEE WHITCOMB, OF PLAINFIELD, ILLINOIS.

TORSION ROD FOR AUTOMOBILES.

Application filed August 28, 1923. Serial No. 659,777.

*To all whom it may concern:*

Be it known that I, LEE WHITCOMB, a citizen of the United States, residing at Plainfield, in the county of Will, State of Illinois, have invented certain new and useful Improvements in Torsion Rods for Automobiles; and I do hereby declare the following to be a full, clear, and exact description of the invention, such as will enable others skilled in the art to which it appertains to make and use the same.

This invention relates to new and useful improvements in running gear, and particularly to running gear for automobiles.

One object of the invention is to provide a torsion means for an automobile running gear adaptable to various positions with relation to the frame and associated parts of the automobile driving mechanism.

Another object is to provide a device of this character wherein the torsion rod is adapted to be connected with a slidable member carried by the frame.

Other objects and advantages will be apparent from the following description when taken in connection with the accompanying drawing.

In the drawing:

Figure 1 is a plan view of the chassis of an automobile, showing the rear axle housing, the differential housing, and the transmission housing.

Figure 2 is a vertical longitudinal sectional view on the line 2—2 of Figure 1.

Figure 3 is an enlarged longitudinal sectional detail view through one end of one of the torsion rods, associated with the ball member.

Figure 4 is a perspective view of a V-shaped torsion member which is adapted for connection with the transmission housing and the rear axle housing.

Figure 5 is a fragmentary sectional view on the line 5—5 of Figure 1.

Referring particularly to the accompanying drawing, the chassis includes the side bars 10, and the transverse bars 11, arranged intermediate the ends of the bars 10. Extending transversely beneath the rear ends of the side bars 10 is the rear axle housing 12, having the central differential housing 13. Forwardly of the transverse bars 11 is the transmission housing 14.

Secured to each of the side bars 10, and depending therefrom, is a metal plate 15, and secured in each plate, in vertical alignment, are the threaded stems 16 of the ball members 17. Similar ball members 18, 19, and 20, are secured in the upper and lower faces of the end portions of the rear axle housing 12, at points at one side of the differential housing, above and below the housing, and also on the upper and lower sides of the differential housing, respectively, as clearly seen in the sectional view Figure 2. Rotatably mounted on the rear tubular extension 21, of the transmission housing 14, is a sleeve 22, the same being retained against longitudinal movement by means of the screw ring 23, engaged on the outer end of the said extension. The rear end of the sleeve has the upper and lower offset arms 24 in each of which is screwed a ball member 25.

Secured on each of the transverse bars 11, and arranged in alignment longitudinally of the chassis, are the angular clips or brackets 26. Slidable in these brackets 26 is the angular stem 27 which has the vertically disposed T-head 28 on its forward end. Screwed into the upper and lower ends of the T-head 28 are ball members 29.

Each of the torsion rods comprises a main rod body 30 having its opposite ends formed with the threaded sockets 31, as clearly seen in Figure 3, and into each of the sockets is screwed a stem 32, a locking nut 33 being engaged on the stem and bearing against the end of the body of the rod. The other end of the stem 32 is cylindrical, as shown at 33′, and is longitudinally slotted, on one side, as shown at 34 for the reception of the ball 35, and neck 35′, of the member 36. Within the cylindrical portion 33 there are arranged the blocks 37 having the concave seats 38 which receive the ball 35, and form the socket for said ball. In the outer end of the portion 33 there is screwed a plug 39, and disposed between this plug and the adjacent block 37 is a coil spring 40, a similar spring 41 being disposed between the other block and the inner end of the portion 33. These springs serve to maintain the ball in a central position longitudinally of the portion 33, but permit movement thereof under impulses imparted to the rod by the rear axle housing.

As shown in Figures 1 and 2, there are two rods in proper position, one being connected to and extending between the ball at the upper end of the T-head 28, and to the ball 19, adjacent the side of the differential housing, while a similar rod is connected to and extends between the lower ball of the T-head, and the lower ball of the rear axle housing, directly below the last-named connection, of the upper rod. In this arrangement of the rods the thrust of the axle causes a forward movement of the rods to slide the T-member forwardly through the brackets 26. These rods may also be applied to the balls 18 and 17, or to the balls 17 and 20. Also, the rods may be connected with the balls 19, of the differential housing, and the balls 25 of the transmission housing.

In Figure 4 there is shown a V-shaped torsion member including the arms 42 connected at one end by the member 43 which is arranged to connect with the ball members of the transmission housing while the other ends of the arms are arranged to connect with the ball members of the axle.

What is claimed is:

The combination with the chassis of an automobile and its cross members, of guides carried by the cross members, a T-shaped member having its stem angular and slidable in the guides, ball members carried by the ends of the head of the T-shaped member, ball members carried by the chassis, and torsion rods having resilient sockets in their ends connected respectively with the ball members of the T-shaped member and the ball members of the chassis.

In testimony whereof, I affix my signature, in the presence of two witnesses.

LEE WHITCOMB.

Witnesses:
 EDITH WHITCOMB,
 GEO. B. LUCE.